3,101,319
Patented Aug. 20, 1963

3,101,319
METHOD FOR CONTROLLING THE GROWTH OF BIOLOGICAL ORGANISMS IN WATER
Charanjit Rai, Chicago, Edward A. Tehle, Jr., Brookfield, and Clarence K. Kambara, Chicago, Ill., assignors to Dearborn Chemical Company, Chicago, Ill., a corporation of Illinois
No Drawing. Filed Mar. 30, 1959, Ser. No. 802,662
6 Claims. (Cl. 210—62)

The present invention is directed to a method for controlling the growth of organisms in water. The invention is particularly directed to inhibiting the growth of organisms such as algae, fungi, and micro-organisms which tend to form slimes when deposited on surfaces of a water circulating system.

Industrial water circulating systems which employ water from natural water courses frequently encounter the problem of organism growth in the water. Over a period of time, the organisms deposited from the water supply may multiply to the extent of interfering with the proper flow of the water by clogging pipe lines and interfering with efficient heat transfer.

In the past copper sulfate has been extensively used to control the growth of organisms, particularly the algae, in industrial water circulating systems. While this compound is an effective algaecide, it has an undesirable side effect in that it tends to plate out of the water and become deposited on metallic surfaces, increasing the tendency of such surfaces to corrode.

One of the principal objects of the present invention is to provide a method for controlling the content of biological organisms in water employing organo-metallic compounds which do not have the drawbacks of copper sulfate.

Another object of the invention is to provide a method for inhibiting the growth of algae and the like in water employing organo-metallic complexes at very low concentrations.

We have found that certain intermetallic complexes of benzimidazoles have the ability to control and inhibit the growth of biological organisms in water at very low concentrations. Specifically, we employ compounds having the general formula:

$$Me(Z)_n$$

where Me is a metal selected from the group consisting of copper, nickel, and cobalt, $n$ is an integer of at least 2 and not more than 4, and Z is a substituted benzimidazole containing the following grouping:

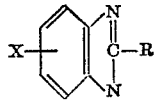

wherein R is selected from the group consisting of hydrogen atoms and alkyl groups containing from 1 to 3 carbon atoms and X is selected from the group consisting of hydrogen atoms, halogen atoms and alkyl groups containing from 1 to 3 carbon atoms.

The copper compounds represent the preferred embodiment of the present invention since they are more effective than the nickel or cobalt derivative. The copper derivatives can exist in two different forms. In common with the cobalt and nickel complexes, copper can form stable four-fold inner metallic complexes having the following general formula:

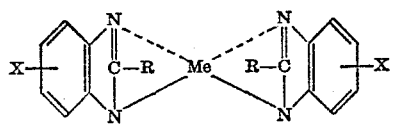

Copper can also form an associated or additive complex of the cupra-ammine type, represented by the following formula:

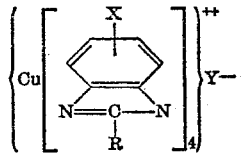

wherein Y−− is an anion, such as the sulfate group.

The following specific examples illustrate methods employed to prepare various compounds involved in the practice of this invention.

EXAMPLE 1

*Copper Bis-Benzimidazoles*

Ammonium hydroxide was added to an alcoholic solution of benzimidazole (2 mols) and copper sulfate (1 mol). A bright red precipitate appeared. It was washed with water followed by alcohol and then dried in a vacuum desiccator. An analytical sample analyzed 21.18% copper as compared with the theoretical of 21.36%.

Employing this synthesis, the following complexes of copper have been prepared:

Copper bis-benzimidazole
Copper bis (2-methyl benzimidazole)
Copper bis (5-chloro benzimidazole)
Copper bis (5-methyl benzimidazole)
Copper bis (2-methyl-5-chloro benzimidazole)
Copper bis (2-isopropyl benzimidazole)
Copper bis (2-isopropyl-5-chloro benzimidazole)
Copper bis (2-isopropyl-5-methyl benzimidazole)

EXAMPLE II

*Copper-Tetrakis-Benzimidazole Sulfates*

A concentrated solution of copper sulfate was treated with an alcoholic solution of benzimidazole. A blue precipitate formed immediately. This precipitate was filtered and washed first with cold water and then with alcohol and dried in air. An analytical sample analyzed 9.36% copper as compared to the theoretical of 9.39. Using this synthesis, the following tetrakis (benzimidazole) copper sulfate compounds were prepared:

2-methyl
2,5-dimethyl
5-chloro-2-methyl
5-methyl
5-chloro
2-isopropyl
5-chloro-2-isopropyl

EXAMPLE III

*Nickel Bis-Benzimidazoles*

Ammoniacal nickel sulfate was added to one and one-half times its weight of benzimidazole in a hot 50% ethanol solution. A violet precipitate was formed, filtered, washed with water and alcohol. The material was then dried in a vacuum desiccator. Using this synthesis, the following nickel derivatives were prepared:

Nickel-bis-benzimidazole
Nickel-bis-(2-methyl benzimidazole)
Nickel-bis-(2-methyl-5-chloro benzimidazole)
Nickel-bis-(2-isopropyl benzimidazole)

EXAMPLE IV

*Cobalt Bis-Benzimidazoles*

A very dilute ammonia was added drop-wise to a mixture of cobalt sulfate and benzimidazole in warm water.

A violet crystalline precipitate separated, and the precipitate was washed with cold water and alcohol. The precipitate was dried in a vacuum desiccator. This synthesis produced the compound cobalt bis-benzimidazole. Using the same synthesis, we prepared the following cobalt derivatives:

Cobalt bis-(2-methyl benzimidazole)
Cobalt bis-(5-chloro benzimidazole)
Cobalt bis-(2-methyl-5-chloro benzimidazole)
Cobalt bis-(2-isopropyl benzimidazole)

The algaecidal properties of the compounds were tested in a method described by Palmer and Maloney, "Preliminary Screening for Potential Algaecides," the Ohio Journal of Science, volume 55, No. 1 (January 1955). The micro-organisms employed were Scenedesmus, a green alga, and Chlamydomonas, also a green alga. The culture medium consisted of a nutrient solution having the following compositions:

| | | |
|---|---|---|
| $Ca(NO_3)_2$ | g | 0.16 |
| $K_2HPO_4$ | g | 0.02 |
| $MgSO_4 \cdot 7H_2O$ | g | 0.05 |
| $Na_2CO_3$ | g | 0.04 |
| $Na_2SiO_3$ | g | 0.05 |
| Ferric citrate | g | 0.006 |
| Citric acid | g | 0.006 |
| Distilled water | ml | 2000 |

The following table indicates the algaecidal activity of some of the compounds described herein:

| Compound | Organism | Effective dose, p.p.m. |
|---|---|---|
| Nickel bis (benzimidazole) | S / C | 12 / 16 |
| Nickel bis (2-methyl-5-chloro-benzimidazole) | S / C | 12 / 24 |
| Copper tetrakis (2-methyl-5-chlorobenzimidazole) sulfate. | S / C | 4 / 2 |
| Copper tetrakis (2-methyl-benzimidazole) sulfate | S / C | 4 / 3 |
| Copper tetrakis (5-methyl-benzimidazole) sulfate | S / C | 6 / 8 |
| Copper tetrakis (5-chloro-2-isopropyl-benzimidazole) sulfate. | S / C | 6 / 12 |
| Copper tetrakis (2-isopropyl-benzimidazole) sulfate | S / C | 8 / 3 |
| Copper tetrakis (5-chloro-benzimidazole) sulfate | S / C | 8 / 8 |
| Copper-(5-chloro-2-methyl-benzimidazole) | S / C | 8 / 4 |
| Copper-(2,5-dimethyl-benzimidazole) | S / C | 3 / 1 |
| Copper bis (2-methyl-5-chlorobenzimidazole) | S / C | 4 / 3 |
| Copper bis (5-methyl-benzimidazole) | S / C | 3 / 4 |
| Copper bis (2-methyl-benzimidazole) | S / C | 6 / 12 |

Depending upon the concentration of algae and other organisms in the water, the dosage levels for the compounds may extend from about 0.5 to 25 parts per million. Maintaining the concentration of the compound within that range by periodic addition to the water supply will normally be effective to prevent harmful concentration of organism growth within the circulating water system.

It will be evident that various modifications can be made to the described embodiments without departing from the scope of the present invention.

We claim as our invention:

1. The method of treating water to inhibit the growth of algae therein which comprises adding to the water, in concentration of 0.5 to 25 parts per million, a compound having the formula $Me(Z)_n$ wherein Me is a metal selected for the group consisting of copper, nickel, and cobalt, n is an integer of at least 2 and not more than 4, and Z is a substituted benzimidazole containing the following grouping:

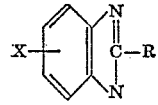

wherein R is selected for the group consisting of hydrogen atoms and alkyl groups containing 1 to 3 carbon atoms, and X is selected from the group consisting of hydrogen atoms, halogen atoms, and alkyl groups containing 1 to 3 carbon atoms, and maintaining in said water an amount of said compound sufficient to reduce the content of biological organisms therein.

2. The method of treating water to inhibit the growth of algae therein which comprises adding to the water, in concentrations of 0.5 to 25 parts per million, the compound copper (2,5-dimethyl benzimidazole), and maintaining in said water an amount of said compound sufficient to reduce the content of biological organisms therein.

3. The method of treating water to inhibit the growth of algae therein which comprises adding to the water, in concentrations of 0.5 to 25 parts per million, the compound copper bis (5-methyl benzimidazole), and maintaining in said water an amount of said compound sufficient to reduce the content of biological organisms therein.

4. The method of treating water to inhibit the growth of algae therein which comprises adding to the water, in concentrations of 0.5 to 25 parts per million, the compound copper bis (2-methyl-5-chloro benzimidazole), and maintaining in said water an amount of said compound sufficient to reduce the content of biological organisms therein.

5. The method of treating water to inhibit the growth of algae therein which comprises adding to the water, in concentrations of 0.5 to 25 parts per million, the compound copper tetrakis (2-methyl-5-chloro benzimidazole) sulfate, and maintaining in said water an amount of said compound sufficient to reduce the content of biological organisms therein.

6. The method of treating water to inhibit the growth of algae therein which comprises adding to the water, in concentrations of 0.5 to 25 parts per million, the compound copper tetrakis (2-methyl benzimidazole) sulfate, and maintaining in said water an amount of said compound sufficient to reduce the content of biological organisms therein.

References Cited in the file of this patent

UNITED STATES PATENTS

| 2,065,418 | Andersag et al. | Dec. 22, 1936 |
| 2,734,028 | Domogalla | Feb. 7, 1956 |

FOREIGN PATENTS

| 388,374 | Great Britain | Feb. 10, 1933 |